United States Patent [19]

Alexander

[11] Patent Number: 5,314,090
[45] Date of Patent: May 24, 1994

[54] MATERIAL FEEDER

[75] Inventor: George R. Alexander, Frankton, Ind.

[73] Assignee: Terronics Development Corporation, Elwood, Ind.

[21] Appl. No.: 855,784

[22] Filed: Mar. 23, 1992

[51] Int. Cl.⁵ .............................................. G01F 11/00
[52] U.S. Cl. .................................... 222/1; 222/47; 222/139; 222/148; 222/154; 222/196; 222/216; 222/311; 222/342; 222/368; 222/407
[58] Field of Search ................. 222/41, 1, 148, 154, 222/158, 196, 216, 311, 342, 344, 345, 352, 368, 406, 407, 410, 414, 44, 47, 138, 139, 142, 310

[56] References Cited

U.S. PATENT DOCUMENTS

| | | | |
|---|---|---|---|
| 247,124 | 9/1881 | Smith | 222/406 UX |
| 1,849,901 | 3/1932 | Anderson | 222/407 X |
| 1,867,532 | 7/1932 | Scarlett | 222/311 X |
| 2,200,773 | 5/1940 | Finne | 222/41 X |
| 2,323,864 | 7/1943 | Weyandt | 222/41 |
| 2,329,666 | 9/1943 | Syverud | 222/407 |
| 2,668,388 | 2/1954 | Thompson | 222/406 |
| 2,806,636 | 9/1957 | Richards | 222/407 |
| 3,258,162 | 6/1966 | Beasley | 222/41 |
| 3,637,112 | 1/1972 | Christy | 222/414 X |
| 3,788,529 | 1/1974 | Christy | 222/414 X |
| 4,231,496 | 11/1980 | Gilson | 222/414 |
| 4,254,897 | 3/1981 | Stocks | 222/407 X |
| 4,264,023 | 4/1981 | Stocks | 222/406 X |
| 4,293,085 | 10/1981 | Nakajima et al. | 222/311 |
| 4,397,409 | 8/1983 | Fantuzzo et al. | 222/407 X |
| 4,480,948 | 11/1984 | Dreyer | 222/414 X |

FOREIGN PATENT DOCUMENTS 0115021 5/1991 Japan ................. 222/345

Primary Examiner—Kevin P. Shaver
Attorney, Agent, or Firm—Lundy and Associates

[57] ABSTRACT

An improved powder feeder having a hopper with an opening in its bottom. A resiliently deformable element is positioned in the opening of the hopper. The element has a flexible exterior dimension and is suitably positioned in relation to the opening to prevent the free flow of material through the opening. The element is mounted on an axle having an axis of rotation. The element is capable of carrying a metered volume of material through the opening as it is rotated. The axle is connected to a variable speed motor. As the element turns, the material flows into the element and moves through the hopper opening in precisely metered amounts relative to the volume and the speed of rotation of the element.

36 Claims, 3 Drawing Sheets

MATERIAL FEEDER

BACKGROUND OF THE INVENTION

The present invention pertains to devices used for delivering a measured volume of powder from a hopper, and more particularly pertains to a powder feeder or meter which can be used to deliver measured amounts of powder as desired and is particularly effective with thermosetting resinous powders.

Powder feeders and meters are used to measure the amount of powder being processed through a device. The rate of flow can be affected by such variables as humidity, particle size particle shape, density, material cohesiveness, and chemical composition. These alone or in combination at times render existing powder feeders useless or troublesome.

Because of their chemical composition, some resinous powders with catalysts have a tendency to undergo cross-linking when very slight amounts of mechanical work or low level heating are acting upon them. Either of these conditions can cause a catalyst-resin reaction, which is exothermic, and result in sintering or agglomeration of these powder particles rendering them unflowable and/or retarding their usefulness in coating applications. Variations in the rate of flow can cause excessive rejects, wasted powder, and extra costs attributable to reclaiming excess powder.

Some previous precision powder feeding and/or measuring devices employ a screw type conveyor much like the shaft of an auger to meter the powder from a hopper to the application device. This method causes mechanical work to be done on the powder due to pressure being exerted by the screw in moving the powder. Any close tolerance moving surfaces, screw to wall clearances, for example, bearings, or seals can cause sintering or agglomeration as above-mentioned with some resinous powders. None of these feeders or meters can be used in a powder coating application in which the excess powder is recycled through the feeder a second time without further degrading the powder's flowability and subsequent functional characteristics.

Another problem is that the most precise powder meters and/or feeders available heretofore, namely the screw type feeders, are only capable of feeding a single output or applicator. Therefore, size limitations and cost become important considerations in setting up a powder meter, conveyor and applicator.

It is therefore highly desirable to provide an improved powder feeder.

It is also highly desirable to provide an improved powder feeder which can precisely meter measured volumes of powder per unit of time.

It is also highly desirable to provide an improved powder feeder whose output can be varied over its operating range with one nearly linear controlling variable.

It is also highly desirable to provide an improved powder feeder which can precisely meter powder without imparting mechanical work on the powder.

It is also highly desirable to provide an improved powder feeder which can precisely meter resinous powder without producing low-level heating effects which cause agglomeration and/or pre-application sintering.

It is also highly desirable to provide an improved powder feeder which is capable of metering reclaimed powder.

It is also highly desirable to provide an improved powder feeder which precisely meters measured volumes of powder and is capable of feeding one or a plurality of applicators.

It is also highly desirable to provide an improved powder feeder which precisely meters measured volumes of powder and is less expensive to manufacture, maintain, and install.

It is finally highly desirable to provide an improved powder feeder which meets all of the above desired features.

SUMMARY OF THE INVENTION

It is an object of the invention to provide an improved powder feeder.

It is also an object of the invention to provide an improved powder feeder which can precisely meter measured volumes of powder per unit of time.

It is another object of the invention to provide an improved powder feeder whose output can be varied over its operating range with one nearly linear controlling variable.

It is another object of the invention to provide an improved powder feeder which can precisely meter powder without imparting mechanical work on the powder.

It is another object of the invention to provide an improved powder feeder which can precisely meter resinous powder without producing low-level heating effects which cause agglomeration and/or pre-application sintering.

It is another object of the invention to provide an improved powder feeder which is capable of metering reclaimed powder.

It is another object of the invention to provide an improved powder feeder which precisely meters measured volumes of powder and is capable of feeding one or a plurality of applicators.

It is another object of the invention to provide an improved powder feeder which precisely meters measured volumes of powder and is less expensive to manufacture, maintain, and install.

It is finally an object Of the invention to provide an improved powder feeder which meets all of the above desired features.

In the broader aspects Of the invention, there is provided an improved powder feeder having a hopper with an opening in its bottom. A resiliently deformable element is positioned in the opening of the hopper. The element has a flexible exterior dimension and is suitably positioned in relation to the opening to prevent the free flow of material through the opening. The element is mounted on an axle having an axis of rotation. The element is capable of carrying a metered volume of material through the opening as it is rotated. The axle is connected to a variable speed motor. As the element turns, the material flows into the element and moves through the hopper opening in precisely metered amounts relative to the volume and the speed of rotation of the element.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 6 is a drawing like FIG. 3 showing a plurality of feeders of the invention side by side.

DESCRIPTION OF A SPECIFIC EMBODIMENT

Figure 1:
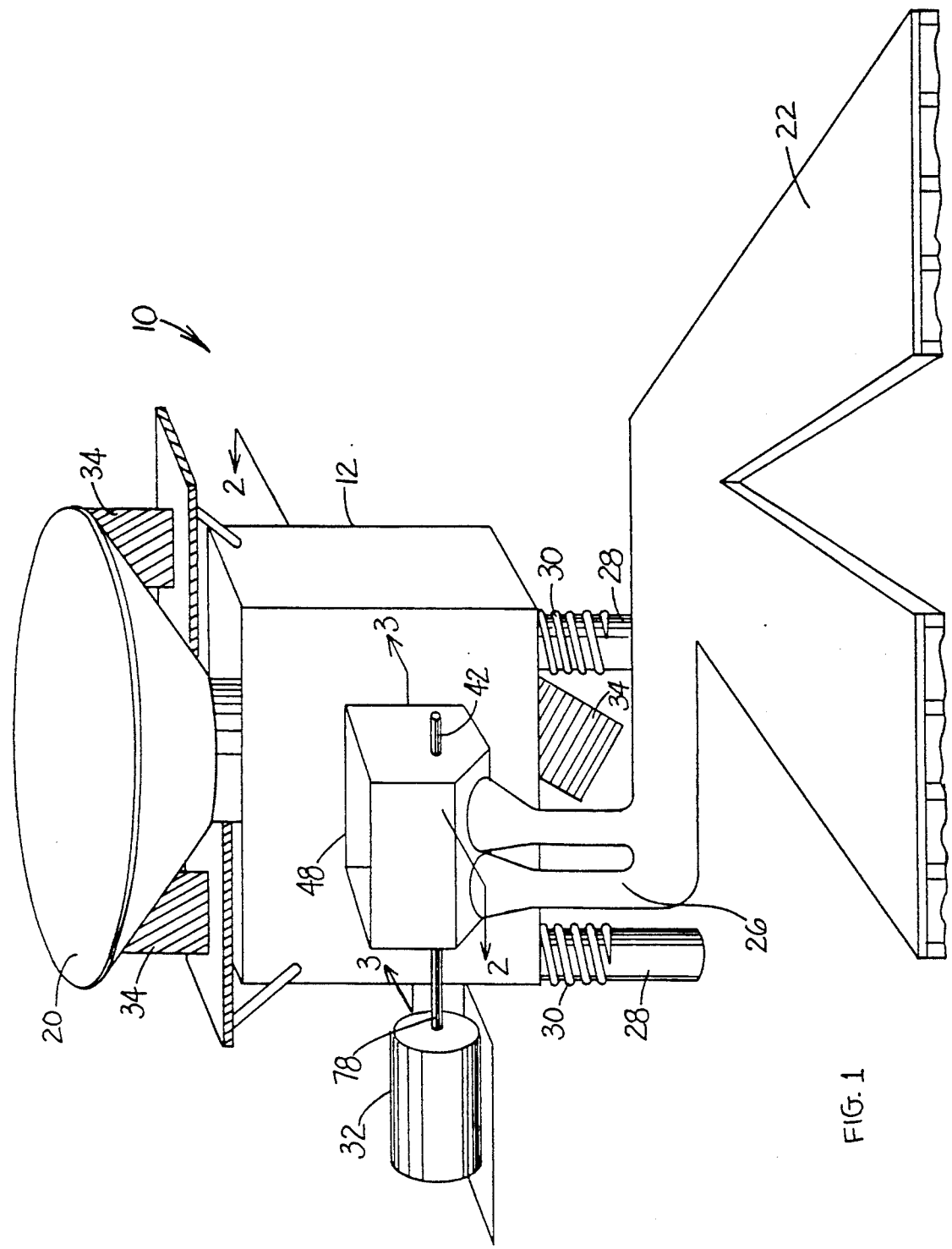
FIG. 1 is a perspective view of the powder feeder of the invention with additional apparatus for delivering powder to an applicator and an applicator.

Referring to FIG. 1, the powder feeder 10 of the invention utilizes a hopper 12 with powder therein. The hopper 12 rests on mounting posts 28 with mounting springs 30 therebetween. A vibrator 34 is secured to the hopper 12. Additional vibrators 34 are also secured to reservoir 20. Both reservoir 20 and hopper 12 have powder 38 therein. Housing 48 has at least one brush 40 therein. At one end of shaft 78 and between the opposite ends, shaft 78 is journalled in housing 48 at 42. The other end of shaft 78 is connected to variable speed motor 32. Connecting tube 24 joins reservoir 20 to hopper 12 so that powder can freely flow from reservoir 20 into hopper 12. Feed lines 26 join housing 48 to applicator 22, as shown in FIG. 1, and provide a means for powder to be conveyed from powder feeder 10 to applicator 22.

In a specific embodiment, hopper 12 and housing 48 are made of transparent material. In another embodiment, hopper 12 and housing 48 are made of plastic, metal, or other material as desired, keeping in mind that many powders tend to agglomerate and cling to the surface of some materials resulting in poor flowability and loss in efficiency of the brush powder feeder 10. Reservoir 20 is generally conical in shape with side walls exceeding the angle of repose of the powders. This geometry assists in gravitationally moving the powder from reservoir 20 into hopper 12.

Figure 3:
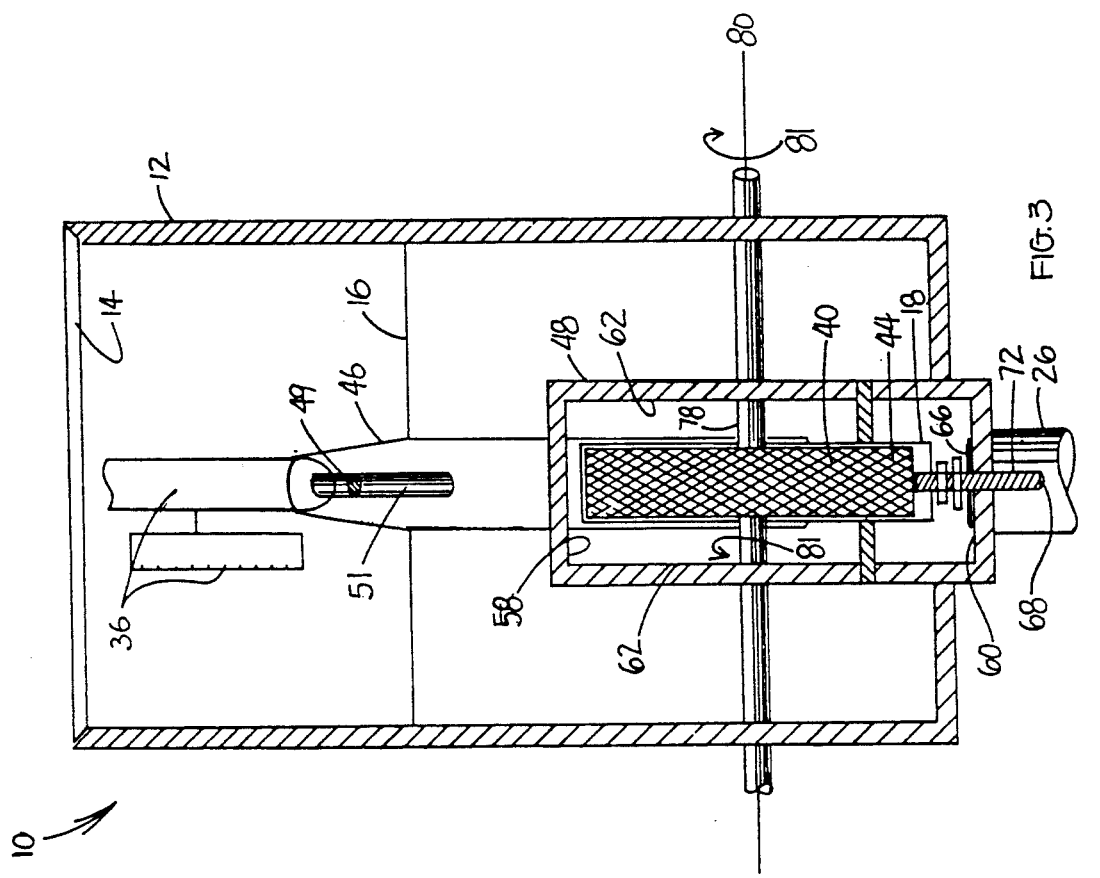
FIG. 3 is a cross-sectional view of the housing and hopper of the powder feeder of the invention showing one embodiment of the micrometer scale and bristle cleaner taken substantially along line 3—3 of FIG. 1.
Figure 2:
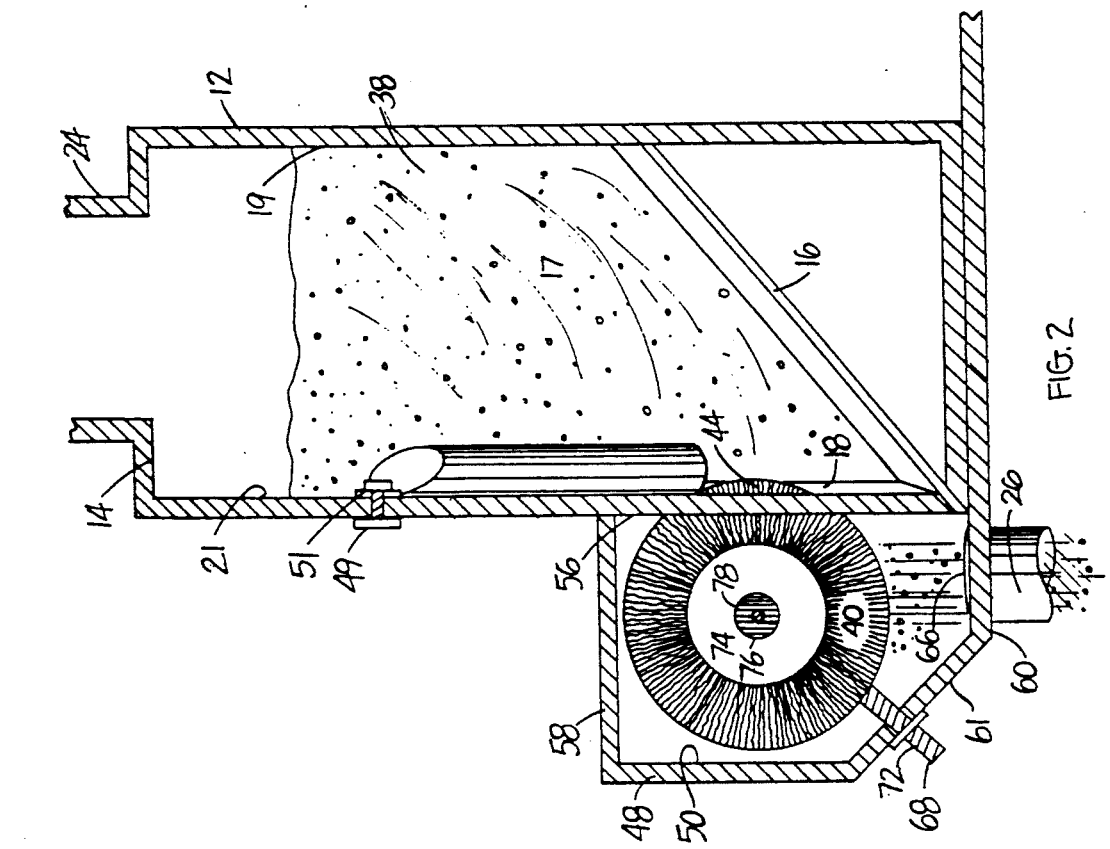
FIG. 2 is a cross-sectional view of the housing and the hopper of the powder feeder of the invention taken substantially along section line 2—2 of FIG. 1.

In the embodiment illustrated in FIGS. 2 and 3, hopper 12 has top 14, bottom 16, sides 17, front 21, and back 19. Bottom 16 is secured to back 19 at a level higher than it is secured to front 21. Bottom 16 is thus angled so that powder 38 is able to slide freely toward opening 18. Gravity and vibration cause the powder to move to opening 18.

The hopper 12, in another embodiment, is parabolically shaped with sides 17 defining a parabola. Opening 18 is positioned generally on the axis near or at the point of intersection of the axis with the parabola. In another embodiment, hopper 12 is conically shaped with opening 18 near its apex. This parabolic or conical structure removes any corners and ledges where powder can collect and be trapped, thus, increasing the overall efficient flow from hopper 12 to exit 18.

In the embodiment illustrated, posterior end 56 is adjacent front 21 of hopper 12. Posterior end 56 of housing 48 is secured to front 21 of hopper 12 by using any suitable securing means, for example, adhesive, or standard nuts and bolts.

Another embodiment has hopper 12 and housing 48 cast together as a single unit, thus, reducing costs associated with manufacturing and production of brush powder meter 10.

Housing 48 has a ventral portion 61, a bottom 60, a top 58, and a pair of sides 62. Housing 48 fully encloses brush 40. Referring to FIG. 2, brush 40 is disc-shaped and mounted on and secured to shaft 78. Housing 48 can be made of plastic, metal, or any other suitable material. Other embodiments have housing 48 made of a transparent, plastic material or an access door in housing 48 (not shown) so that during operation, observations and adjustments can be made.

Brush 40 is positioned in housing 48 so that bristles 44 occlude opening 18. Bristles 44 can be of a plastic nylon, wire, or any suitable material so that brush 40 is capable of "holding back" powder from flowing freely from hopper 12 through opening 18. Bristles 44 must be of a suitable material, length and dimensions whereby upon a selected speed of rotation, brush 40 permits powder 38 to penetrate bristles 44 in a precise fashion and be delivered in a measured amount through exit port 66 in bottom 60 to applicator 22. In specific embodiments, the speed of brush 40 is always less than that necessary to throw material 38 from brush 40 by centrifugal force. In specific embodiments, the speed is usually less than 25 mph.

In the embodiment illustrated, brush 40 has a hub 74 with a center bore 76. Shaft 78 extends through center bore 76. Shaft 78 with brush 40 thereon defines an axis of rotation 80 having a direction of rotation 81 as shown. As seen in FIG. 1, at least one of shaft ends 82 is connected to an adjustable speed motor 32, thus, making shaft 78 and brush 40 rotatable at a precise speed.

In another embodiment of the invention, hopper 12 has a plurality of housings 48 containing at least one brush 40 therein.

In the embodiment illustrated, hopper 12 has a door 46 mounted to front 21. Door 46 is adjustable and has adjustable securing means 49. In the embodiment illustrated, door 46 has a convex shape respecting powder side or interior of hopper 12 and a concave shape respecting bristles 44 that occlude opening 18 as shown in FIG. 2. In another embodiment, door 46 may be eliminated, and instead, a plurality of housings 48 of variable size and with variable sized brushes therein and variable sized entry ports 64 adjacent opening 18 are secured to hopper 12.

The flow rate of powder 38 from hopper 12 through opening 18 and through exit port 66 is controlled, among other things, by the rate of speed that brush 40 is rotated. Therefore, rate of speed, diameter of the brush 40, the thickness of brush 40, and the size of the opening 18 determined by door 46 are each elements that contribute to overall powder flow rates to applicator 22.

In the embodiment illustrated, adjustable securing means 49 provides a door 46 with a slot 51 making door 46 slideable vertically along front 21 of hopper 12. Door 46 units powder 38 from contacting bristles 44.

One embodiment of the invention has a micrometer scale 36 secured to front 21 of hopper 12 on its exterior so that the position of door 46 can be visible and adjustable by the operator while brush powder feeder 10 is in its operable mode.

Feed lines 26 are connected to bottom 60 of housing 48 and provide a path for powder 38 to flow from housing 48 to applicator 22. Feed lines 26 are attached to each housing 48 and complement the number of brushes 40 therein. Feed lines 26 are secured to bottom 60 of housing 48 so Chat sharp corners which would normally result in the collecting of powder are eliminated consistently with the overall construction of feeder 10 which minimizes the number of sharp corners and pockets in which small amounts of Powder light collect and then "break away" thereby causing irregularities in the flow of powder to occur.

Referring to FIGS. 2 and 3, housing 48 has bristle cleaner 68 secured thereto. Bristle cleaner 68 makes contact with brush 40 so as to flex bristles 44 and remove residue Powder 70 from bristles 44. In the embodiment illustrates bristle cleaner 68 has a rod 72 extending through the ventral Portion 61 Of housing 48. Bristle cleaner 68 is adjustable so that a precise amount of rod 72 can be allowed Lo contact bristles 44. Powder residue 70 therefore leaves the occupancy of the bristles 44 and exits port 66 and is delivered via feed line 26 to applicator 22. Nearly clean bristles 44 are always presented to the Powder in hopper 12.

In the embodiment illustrated, hopper 12 has a vibrator 34 secured thereto as shown in FIG. 1. Vibrator 34 is connected to an adjustable voltage source so that its vibration rate can be made variable. Another embodiment has a vibrator secured to reservoir 20. Still another embodiment has a vibrator not being secured to reservoir 20, but with vibrator 34 still being secured to hopper 12. Vibrator 34 provides a complementary means to the gravitational forces acting upon the powder causing it to flow steadily from, the reservoir 20 to hopper 12 where it contacts bristles 44.

Thus, in the embodiment illustrated, brush powder feeder 10 utilizes a storage hopper 12 with appropriate openings 18 for each brush 40. A vibrator 34 is secured to hopper 12 thereby preventing substantial bridging or ratholing of the powder to occur in the hopper, and thus, to assist in gravitationally moving the powder to the openings 18.

Very little mechanical work is done on the powder employing the conveying means of the vibrator 34, brush 40, and gravitational forces. Vibration and gravity move the powder 38 into the bristles 40 where very little work is added as the brush rotates and releases the powder by gravity to exit 66. A plurality of brushes 40 may be mounted on shafts 78 that are driven independently by variable speed motors 32. Therefore, by selecting a vibration rate, a door 46 position, a brush 40, a rotational speed, and the chemical composition of the powder, precise amounts of powder can be delivered from reservoir 20 into hopper 12 into applicator 22 or any other collecting vessel.

In operation, reservoir 20 and hopper 12 of powder feeder 10 are filled with powder. The position of door 46 is selected using micrometer scale 36. A suitable brush 40 of a suitable size and having suitable bristles 44 is selected with an appropriately sized housing 48. A vibrational rate is selected as desired. As the brush 40 rotates at a selected speed with vibrator 34 vibrating at the selected rate, powder 38 flows through the hopper opening 18 into bristles 44. As the brush rotates, the bristles that are exposed to the powder in hopper 12 fill with powder and are rotated over exit port 66 and then are engaged with bristle cleaner 68 so as to largely remove the powder from the bristles. The bristles continue to rotate about axis 80 and ultimately are again exposed to the powder within hopper 12. The brush, thus, has a defined powder capacity, which when the brush is rotating continuous, in contrast to being incremental, thereby resulting in the continuous feeding of powder through the exit port 66 in a continuous manner. The speed of rotation of brush 40, the position of door 46, and the vibration rate of hopper 12 governs the rate of flow of powder 38 to applicator 22. Very little or no mechanical work is done on powder 38 by the bristles of brushes 40 since powder 38 is moving essentially by gravity. Brush 40 meters the flow of powder through the feeder with little work being done on the powder. Any cross-linking tendencies of resinous powders is thereby minimized.

In addition to varying the speed of rotation of brushes 40 and vibration rate of hopper 12, the size of opening 18 in hopper 12 can be varied by adjusting door 46, as shown in FIG. 2, to increase or decrease the surface area of bristles 44 exposed to hopper 12. All of these elements influence the rate of flow of material to applicators 22. In calibration of a feeder 10 having a plurality of feeding ports 66, openings 18 serve as the variable to compensate for differences between brushes 40 having slight variations to ensure uniform output to each exit port 66.

The accuracy of the rate of flow attainable with the powder feeder 10 in testing operations was plus or minus 4% across a flow rate range per brush 40 from about 250 grams/min to about 500 grams/min using a specific embodiment such as illustrated.

Table 1 shows operation of a specific brush powder feeder 10 in Runs 1-6 with the vibrator set at 90 volts and the motor's rpm set at 5.

TABLE 1

| Sec. | R1 | Sec. | R2 | Sec. | R3 | Sec. | R4 | Sec. | R5 | Sec. | R6 |
| --- | --- | --- | --- | --- | --- | --- | --- | --- | --- | --- | --- |
| 5 | 104.6021 | 5 | 99.4939 | 5 | 99.2932 | 5 | 99.9316 | 5 | 97.7178 | 5 | 99.0905 |
| 10 | 86.1795 | 10 | 109.2000 | 10 | 99.6525 | 10 | 103.2000 | 10 | 95.6238 | 10 | 102.1925 |
| 15 | 98.3814 | 15 | 104.5032 | 15 | 105.2000 | 15 | 102.5223 | 15 | 100.4640 | 15 | 101.3155 |
| 20 | 98.4296 | 20 | 94.1073 | 20 | 99.4341 | 20 | 98.8141 | 20 | 99.9255 | 20 | 92.8349 |
| 25 | 98.8800 | 25 | 97.0667 | 25 | 100.6353 | 25 | 101.8087 | 25 | 99.1200 | 25 | 100.1199 |
| 30 | 97.3089 | 30 | 97.2656 | 30 | 98.8568 | 30 | 95.8489 | 30 | 97.1107 | 30 | 99.2183 |
| 35 | 93.8916 | 35 | 96.8958 | 35 | 98.7756 | 35 | 101.3266 | 35 | 97.4452 | 35 | 100.8000 |
| 40 | 97.1164 | 40 | 96.1679 | 40 | 98.2650 | 40 | 96.6000 | 40 | 97.9962 | 40 | 99.8272 |
| 45 | 97.2438 | 45 | 100.4000 | 45 | 97.8805 | 45 | 97.6844 | 45 | 97.8943 | 45 | 99.5257 |
| 50 | 98.0645 | 50 | 100.3685 | 50 | 98.2800 | 50 | 100.8459 | 50 | 97.6926 | 50 | 99.6420 |
| 55 | 93.3976 | 55 | 99.5295 | 55 | 97.8024 | 55 | 100.0728 | 55 | 96.5455 | 55 | 99.1936 |
| 60 | 93.1000 | 60 | 98.9282 | 60 | 97.4431 | 60 | 100.5238 | 60 | 95.0776 | 60 | 95.3254 |
| AVG | 98.38137 |  | 99.49388 |  | 99.29320 |  | 99.93159 |  | 97.71776 |  | 99.09045 |

Figure 4:
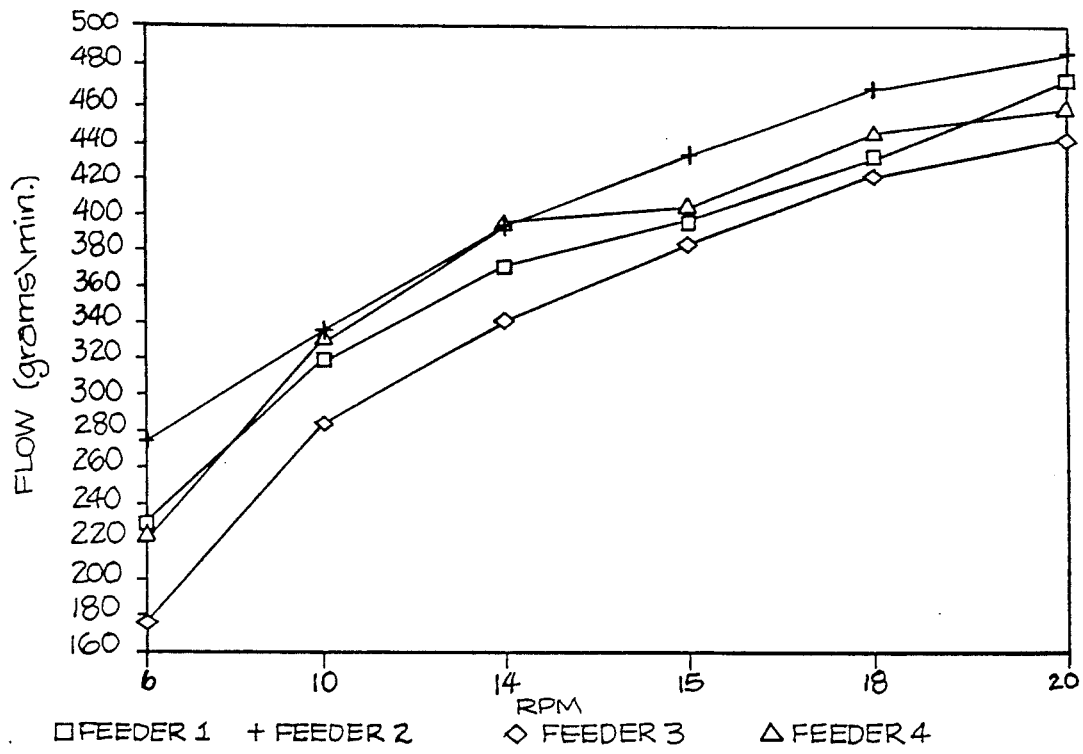
FIG. 4 is a chart of flow rate versus RPM for four unadjusted feeders.
Figure 5:
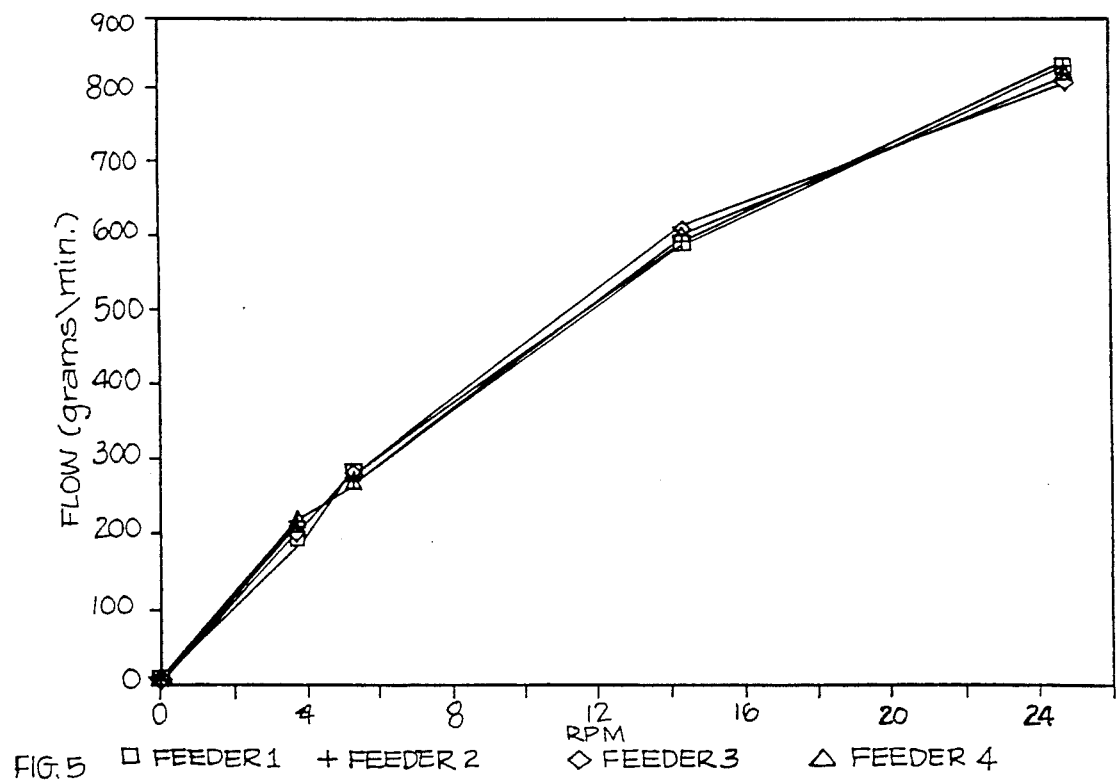
FIG. 5 is a chart like FIG. 5 for the same four feeders fully adjusted.

FIG. 4 shows the average flow rate in grams per minute versus the rpm of the brushes employed on a specific brush powder feeder 10 having four feeding, lines prior to precisely adjusting door 46 covering openings 18. FIG. 5 is the same data as FIG. 4 subsequent to adjusting doors 46 covering openings 18 of the hopper.

The brush feeder 10 of the invention can be made to deliver a measured amount of powder to an applicator or other receiver at any given brush 40 rpm setting, vibrator 43 setting and hopper discharge opening 18 size. Referring to FIG. 4, the average flow of powder at each rpm setting of the brush feeder 10 is plotted for a given vibrator setting. The differences shown in FIG. 4 are caused by differences in the brush 40 and size of opening 18. FIG. 5 shows a plot similar to FIG. 4 after each of the discharge openings 18 have been adjusted in size so as to meter powder at the same rate. The vibrator 43 settings remain the same. FIG. 5 shows the near linear relationship between flow rate and brush 40 rpm over the entire operating range and illustrates that the output of the brush feeder 10 of the invention at any particular setting of rpm, vibrator 43 and opening 18 are very consistent and readily enable process control to an improved degree.

The brush powder feeder 10 of the invention meters powder precisely imparting little mechanical work on the powder and is capable of processing reclaimed powder without experiencing irregularities in flow rates. Additionally, the brush powder feeder 10 of the invention precisely meters powder without producing any low-level heating effects to the powder, thus reducing the likelihood of cross-linking and initiation of the catalyst-resin reaction, which is exothermic and retards its flowability. Using a powder that was hereto difficult to feed with conventional feeders, powder was recycled through the feeder of the invention multiple times without any appreciable loss of powder flowability. Lastly, the feeder 10 provides an accurate meter capable of feeding one or a plurality of applicators which is economical to manufacture, maintain, and install. Because the brush powder feeder 10 of the invention imparts so little mechanical work on the powder being dispensed, the powder dispensed by the brush feeder may be recycled to the hopper and dispensed again any number of times. Even if the powder is a thermosetting resin which has a tendency to undergo cross-linking when very slight amounts of mechanical work or low level heating are acting upon them, experience has shown that these powdered resins may be discharged and recycled any number of times, as desired.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A material feeder comprising a hopper having a discharge opening therein, a brush positioned in said opening, a housing surrounding said brush, said housing being spaced from said brush without deforming said brush, said housing mounted to said hopper, said brush mounted for rotation in said opening at speeds below that necessary to discharge material from said brush by centrifugal force, said brush occluding said opening, said brush being in contact with and receiving therein the material in said hopper, whereby by rotation of said brush a volume of material is metered through said opening.

2. The material feeder of claim 1 wherein said brush rotates about an axis, said axis being generally parallel to said opening.

3. The material feeder of claim 1 wherein said brush is journaled for rotation exterior of said housing.

4. The material feeder of claim 1 wherein said opening is planar and said brush is disc-shaped, said brush extending through said opening into said hopper, said brush rotates about an axis, said axis being generally parallel to said opening.

5. The material feeder of claim 1 wherein said opening is planar and said brush is disc-shaped, said brush extending through said opening into said hopper, said brush rotates about an axis, said axis being generally parallel to said opening, said material being particles of solid material of a size capable of being carried by said brush between the bristles of said brush.

6. The material feeder of claim 1 wherein said opening is planar and said brush is disc-shaped, said brush extending through said opening into said hopper, said brush rotates about an axis, said axis being generally parallel to said opening, said material being particles of solid material of a size capable of being carried by said brush between the bristles of said brush, a bristle cleaner, said bristle cleaner flexes said bristles to discharge said material from said bristles, said bristle cleaner being spaced in the direction of rotation of said brush from said opening.

7. The material feeder of claim 1 wherein said opening is planar and said brush is disc-shaped, said brush extending through said opening into said hopper, said brush rotates about an axis, said axis being generally parallel to said opening, said material being particles of solid material of a size capable of being carried by said brush between the bristle of said brush, a bristle cleaner, said bristle cleaner flexes said bristles to discharge said material from said bristles, said bristle cleaner being spaced in the direction of rotation of said brush from said opening.

8. The material feeder of claim 1 wherein said hopper has a vibrator secured thereto.

9. The material feeder of claim 1 wherein said brush has a hub with a center bore therethrough, and further comprising a shaft having an axis extending through said bore and a pair of shaft ends extending outwardly from said hub, said shaft ends extending through said sides of said housing being journaled exterior of said housing, at least one of said shaft ends being secured to a variable speed motor.

10. The material feeder of claim 1 wherein said hopper has a powder reservoir secured to said hopper, said reservoir having vibrator secured thereto.

11. The material feeder of claim 1 wherein said opening is planar and said brush is disc-shaped, said brush extending through said opening into said hopper.

12. The material feeder of claim 11 wherein said opening is rectangular and said brush has a thickness from about equal to to larger than the width of said opening and a chordal dimension larger than the length of said opening.

13. The material feeder of claim 1 wherein said opening has a door, said door being selectively positioned to adjust the area of said opening, said brush occluding said opening at all positions of said door.

14. The material feeder of claim 13 wherein said door overlaps said opening and is secured to the inside of said hopper, said door and opening having a concave shape facing said bristles and a convex shape facing said powder, said shape being complementary to said bristles.

15. The material feeder of claim 13 wherein said door has a scale connected thereto, said scale being readable from the exterior of said material feeder, whereby the size of said opening can be precisely selected.

16. The material feeder of claim 13 wherein said housing has anterior and posterior ends and a top and a bottom and a pair of sides, an entry port in said posterior end and an exit port in said bottom, said opening and said door being adjacent said entry port.

17. The material feeder of claim 16 wherein said brush has bristles, and a bristle cleaner positioned in said housing, said bristle cleaner removes said material from said bristles, said bristle cleaner being spaced in the direction of rotation of said brush from said opening adjacent said exit port, whereby upon rotation of said brush said material is removed from said bristles and deposited in said exit port.

18. The material feeder of claim 1 wherein said material is particles of solid material of a size capable of being carried by said brush between the bristles of said brush.

19. The material feeder of claim 18 wherein said bristles are of a sufficient number and arranged in a sufficient density to prevent the flow of material through said opening, said bristles having a length to give said brush a predetermined capacity of material.

20. The material feeder of claim 18 wherein said bristles are chosen from the group consisting of wire, plastic and natural bristles.

21. The material feeder of claim 18 wherein said hopper and said housing are made of transparent material 22. The material feeder of claim 18 wherein said hopper is made of material chosen from the group consisting of plastic and metal.

23. The material feeder of claim 18 wherein said housing is made of material chosen from the group consisting of metal and plastic.

24. The material feeder of claim 18 further comprising a bristle cleaner, said bristle cleaner flexes said bristles to discharge said material from said bristles, said bristle cleaner being spaced in the direction of rotation of said brush from said opening.

25. The material feeder of claim 24 wherein said brush and bristle cleaner are enclosed in said housing.

26. A method of delivering measured volumes of flowable material comprising the steps of placing a brush within the discharge opening of a hopper containing a material to be dispensed without deforming said brush, exposing a first portion of said brush to the material within said hopper, said brush occluding said opening, said first brush portion receiving therein a portion of said material from within said hopper, rotating said brush in said hole at speeds below that necessary to discharge said material from said brush by centrifugal force to move said first brush portion from within said hopper to outside of said hopper and exposing a second brush portion to said material, discharging said material from said first brush portion exterior of said hopper, and repeating said exposing, rotating and discharging steps to reexpose said brush portions to said material and to discharge said material from said brush portions.

27. The method of claim 26 wherein said exposing and rotating and discharging steps are repeated continuously.

28. The method of claim 26 wherein said material is particles of solid material of a size capable of being carried by said brush between the bristles of said brush.

29. The method of claim 26 wherein said discharging step is performed by a bristle cleaner, said bristle cleaner flexes said bristles to discharge said material from said bristles, said bristle cleaner being spaced in the direction of rotation of said brush from said opening.

30. The method of claim 26 wherein the rpm of said brush has a linear relationship to material flow.

31. The method of claim 26 further comprising the step of returning any amount desired of said material after performing said discharging step thereon to said hopper.

32. The method of claim 26 wherein the rate of flow of material from said discharging step can be maintained at the same rate with different elements by changing the size of said discharge opening.

33. The method of claim 26 wherein there are a plurality of discharge openings and a plurality of brushes therein, and further comprising the step of calibrating each of said brushes to have essentially the same relationship between brush rpm and rate of material flow through said openings.

34. The method of claim 33 wherein said openings are of different hoppers.

35. The method of claim 33 wherein said brushes are driven by different variable speed motors.

36. The method of claim 33 wherein said calibration step includes adjusting the size of said discharge openings.

* * * * *